UNITED STATES PATENT OFFICE.

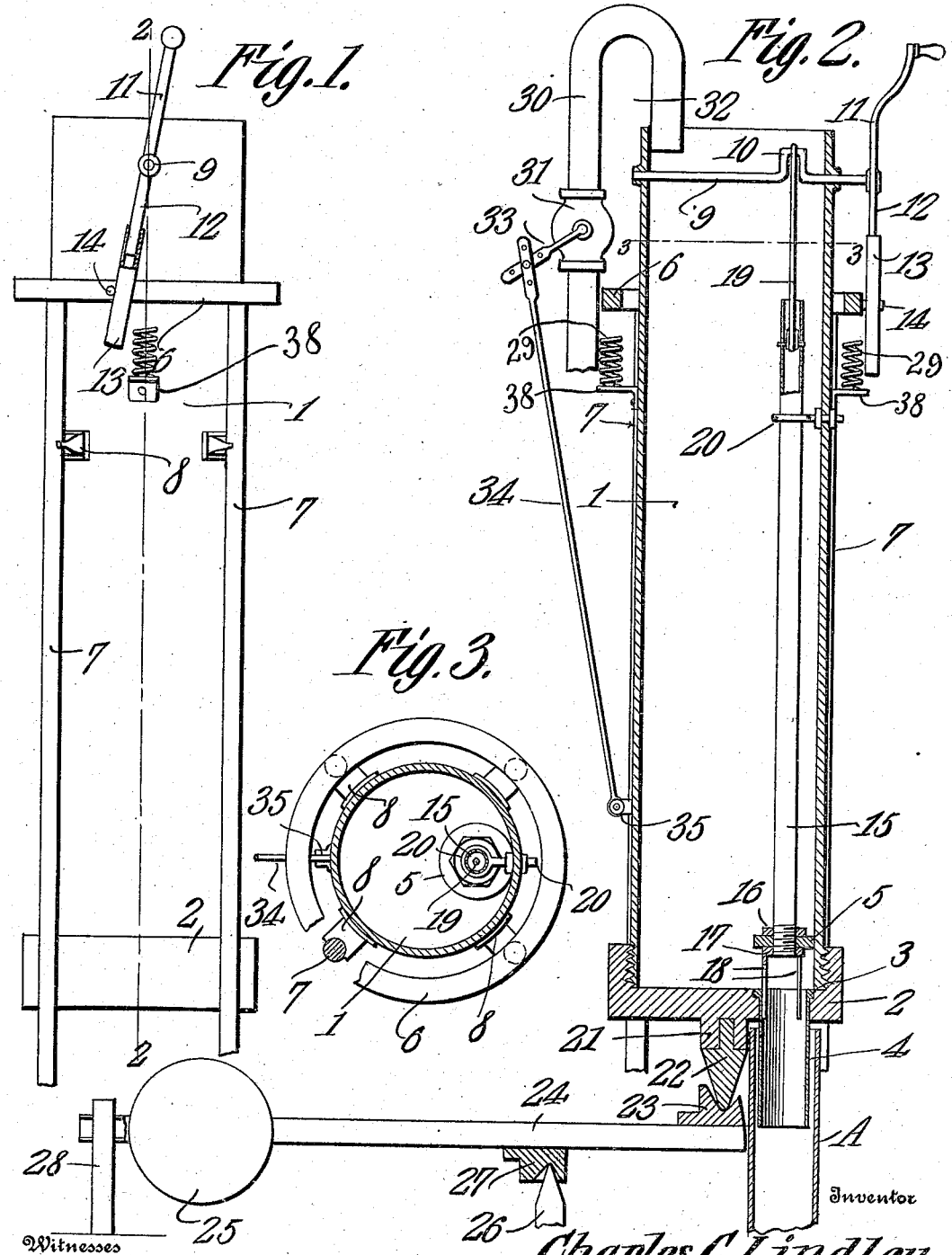

CHARLES CLARK LINDLEY, OF MEMPHIS, TENNESSEE.

FLUSHING-TANK.

939,521.

Specification of Letters Patent.

Patented Nov. 9, 1909.

Application filed November 6, 1908. Serial No. 461,392.

*To all whom it may concern:*

Be it known that I, CHARLES C. LINDLEY, a citizen of the United States, residing at Memphis, in the county of Shelby and State of Tennessee, have invented a new and useful Flushing-Tank, of which the following is a specification.

This invention relates to flushing tanks; and has for its object to provide a water receptacle of much greater height than width, whereby a greater pressure is obtained for cleansing purposes and a lesser quantity of water is so disposed as to do the work of a greater quantity when inclosed in larger and flatter tanks; to mount the tank on a counterbalanced lever so as to rise and fall at certain periods as the water flows out of and into the receptacle; the provision of an outlet valve by preference manually operated through the medium of a hand crank, to open and hold open the flushing pipe until the outlet valve is closed, the tank as it empties being elevated by the supporting lever to open a cock admitting water from above into said tank.

With these and other objects in view the invention consists of the novel construction, combination and arrangement of parts hereinafter described and claimed and illustrated in the accompanying drawing forming a part of this specification, in which:—

Figure 1 is an elevation of the flushing tank and its frame, Fig. 2 is a vertical sectional view on the line 2—2 of Fig. 1, and Fig. 3 is a horizontal sectional view on the line 3—3 of Fig. 2.

Like reference characters are used for the same parts in all the figures.

In the drawing, 1 indicates the flushing tank made in cylindrical form and of great height as compared with its diameter. The top of the tank is open but the bottom is closed by a screw cap or closure 2 having a circular opening through the bottom at one side thereof, the upper end of said opening being slightly greater in diameter to receive a flange 3 on the upper end of the outlet pipe 4 which latter closely fits the opening, the said outlet pipe 4 having a loose telescopic connection with a pipe A leading to the receptacle to be flushed. The increased thickness of the upper end of the outlet pipe 4 formed by the flange 3 serves as a seat for the outlet or flushing valve 5.

Surrounding the tank 1 near its upper end but spaced therefrom is a ring 6 supported on the upper ends of guide rods 7 fastened to some firm support (not shown) below the operating mechanism, the aforesaid ring holding the guide rods 7 in true vertical position and properly spaced apart. The vertical movement of the tank 1 is guided at its lower end within the upright rods 7 by the closure 2 which slides easily therein, the upper part of the tank having a guide block 8 securely fastened to the periphery of the tank 1 opposite each rod 7 and partly surrounding it. The distance of the guide blocks 8 below the ring 6 is such that the tank never rises high enough for the blocks to strike the ring.

Extending diametrically across the tank 1 near its upper end is a shaft 9 having a crank 10 formed thereon within said tank and directly above the outlet valve 5. The crank shaft 9 is journaled in the sides of the tank in any suitable manner, one end of the said shaft projecting a short distance outside the tank and carrying a hand crank 11 which has a pin 12 extending beyond and on the opposite side of the axis of the crank and in line with it. A short tube 13 is telescopically mounted on the pin 12 to regulate the quantity of water passing through the flush or outlet pipe 4. The regulation is accomplished through the means of a fixed pin 14 on the ring 6 and the telescopic tube 13 on the hand crank 11.

The outlet or flushing valve is secured on the lower end of a tubular valve rod 15 by means of an upper nut 16 and a lower nut 17 clamping the valve 5 between them. The lower nut 17 has projecting from its under face guide pins 18 which travel in the outlet or flush pipe 4 and preserve the proper relation between the valve 5 and its seat 3. The top of the valve rod 15 extends upwardly nearly to the top of the tank and is there pivotally attached to a connecting rod 19 mounted on the interior crank 10 of the cross shaft 9. Reversing the position of the crank from that shown in the drawing will cause the valve 5 to seat itself and prevent the escape of water from the tank. The valve rod 15 is made tubular to serve as an overflow pipe for the tank and is guided in its vertical movement by an eye 20 fastened to the inside of the tank.

Projecting for a short distance downwardly from the bottom of the closure 2 is a lug 21 in which is firmly fastened a wedge-shaped foot piece 22 seated in a bearing 23 secured to one arm of a straight lever 24 having an adjustable counterbalance 25 on its opposite arm. The lever 24 is supported on a fixed post 26 having a wedge shaped upper end seated in a V-shaped notch in a block 27 on the under side of the lever 24. The entire weight of the tank, the water therein and the above described attachments to the tank on one arm of the lever, and the counterbalance weight 25 on the other and longer arm rests on the knife edge of the fixed post 26. The outer end of the lever arm carrying the counterweight 25 is perforated vertically for an upright post 28 to guide the movement of said lever.

Fastened to the outside of the tank 1 a suitable distance below the ring 6 are two brackets 38 to each of which is fastened one end of an upright coil spring 29, the other end being free and adapted to strike the under surface of said ring 6 as the tank reaches its upward limit of movement to prevent shock or jar to the apparatus.

Water enters the flushing tank 1 through a feed pipe 30 provided with a valve 31 and having its discharge end bent upon itself and entering the tank from above. The loop 32, formed by bending the feed pipe is sufficiently long to permit the tank rising to the limit of its travel. An arm 33 is attached to the plug of the valve and a connecting rod 34 adjustably pivoted to the valve arm extends downwardly toward the lower end of the tank and there is hinged to a lug 35 secured to said tank. As the tank rises the feed valve 31 is opened and remains open until the outlet valve is closed.

In the operation of the invention, let it be assumed the hand crank 11 is in a reversed position from that shown in the drawings thus closing the outlet valve 5, and that the tank is properly filled with water. In this case the parts will be in normal position. If it be desired to discharge the water from the tank, the hand crank will be turned to the position shown in the drawing to open the outlet valve, the projection 13 on the crank then bearing against the pin 14. Water will rush through the telescoping pipes 4 and A to its destination, lessening the weight on the short arm of the lever 24 which then begins to rise and with it the tank, outlet valve, crank shaft 11 and other parts including the lug 35 which through the medium of the connecting rod 34 begins opening the inlet valve. The water continuing to escape, the tank rises higher, opening the inlet valve more and more until it has reached its maximum. The outflow however is greater than the incoming water and in a short time the tank will be empty, the water flowing away from the tank at the same rate it enters it. Before the tank is completely empty, the springs 29 on the tank 1 have reached the ring 6 which cushions the upward movement of the tank. By the time the tank is empty of excess water, it has risen to such a height that the telescopic tube 13 on the hand crank 19 is above the pin 14 on the ring 6, and able to pass it, which it does because the weight of the outlet valve parts including the valve stem hangs from the crank 10 on one side of the vertical. Since the weight of the outlet valve parts hangs from the crank 10 at one side of the vertical the weight of these parts will cause the tube 13 to remain in contact with the pin 14 after the hand crank 11 has been moved into an arc of approximately 180° and into the position shown in the drawings. As the tank empties it will rise, and on its rise, the lower end of the tube 13 will be lifted clear of the pin 14. The weight of the valve parts which holds the tube in contact with the pin, will, when the end of the tube is raised clear of the pin cause the hand crank 11 to swing into a position approximately 180° remote from the position shown in the drawings, closing the outlet at the bottom of the tank. The bend in the crank 11, shown most clearly in Fig. 2, will permit the said crank to pass the pin 14, upon the repetition of the tank draining operation. The outlet valve is immediately seated so that the water entering the tank now fills it and when enough has entered to overcome the counterbalance weight on the lever 25 the tank begins to descend and continues to fall until the connecting rod 34 finally closes the cock. The parts at this stage are once more in normal position.

Having thus described my invention, what is claimed is:—

1. A flushing tank provided with a water receptacle adapted to automatically rise and fall, an outlet valve for said receptacle connected to opening and closing means, an inlet pipe provided with a cock, and means for opening said cock when the receptacle rises and closing it when the receptacle falls.

2. A flushing tank provided with a vertically movable water receptacle, a fixed inlet pipe having a cock thereon, an outlet valve for said receptacle connected to opening and closing means the whole movable with the receptacle and a rod connecting the tank with said cock to open and close the same as the tank rises and falls.

3. A flushing tank provided with an upright water receptacle automatically movable in vertical direction, a lever supporting on one arm said receptacle and on its other arm an adjustable counterbalance, a fixed feed pipe and cock thereon arranged to discharge into said receptacle, a discharge valve for said receptacle connected with means for opening and closing the same movable with said receptacle, a rod connected to said receptacle and the cock for opening and closing said cock as the receptacle rises and falls, and a fixed means adapted to release the discharge valve opening means and permit said discharge valve to close by gravity.

4. A flushing tank provided with an intermediate fulcrumed lever, an upright water receptacle automatically movable in vertical direction supported on one arm of said lever, counterbalanced by a movable weight on the other arm, an inlet pipe containing a cock connected by a rod to said receptacle, a crank shaft journaled diametrically at the top of the receptacle, a hand crank having a diametrically opposite projection, a discharge valve in said receptacle opened by said crank shaft to exhaust the water in said receptacle and permit it to rise and open the inlet cock, and means for disengaging said hand crank and permitting the outlet valve to close by gravity.

5. A flushing tank provided with a counterbalanced water receptacle, a fixed feed pipe therefor containing a cock, a discharge valve in said receptacle, a horizontal shaft provided with a crank extending across said section, a valve rod serving as an overflow pipe connected to the crank on said shaft, a hand crank on said shaft for turning the same to open the outlet valve, said crank being a pin projecting in the opposite direction, a connecting rod attached to said receptacle and the cock for opening and closing said cock as the receptacle rises and falls, and a stop for preventing the escape of said pin on the hand shaft until the receptacle has risen high enough to permit it to escape when the outlet valve closes by gravity.

In testimony that I claim the foregoing as my own, I have hereto affixed my signature in the presence of two witnesses.

CHARLES CLARK LINDLEY.

Witnesses:
W. H. CHILDERS,
A. B. JONES.